US007210798B2

(12) United States Patent
Belliveau et al.

(10) Patent No.: US 7,210,798 B2
(45) Date of Patent: May 1, 2007

(54) IMAGE PROJECTION LIGHTING DEVICE AND CONTROL SYSTEM

(75) Inventors: Richard S. Belliveau, Austin, TX (US); Vickie Lynn Claiborne, Austin, TX (US); Timothy G. Grivas, Austin, TX (US); Brian Emerson Jurek, Austin, TX (US); Jeffrey K. Washburn, Leander, TX (US)

(73) Assignee: High End Systems Inc., Austin, TX (US)

( * ) Notice: Subject to any disclaimer, the term of this patent is extended or adjusted under 35 U.S.C. 154(b) by 388 days.

(21) Appl. No.: 10/346,784

(22) Filed: Jan. 17, 2003

(65) Prior Publication Data

US 2004/0142103 A1 Jul. 22, 2004

(51) Int. Cl.
*G03B 21/26* (2006.01)
*G03B 21/20* (2006.01)
*G03B 3/00* (2006.01)
*G03B 17/00* (2006.01)
*H04N 5/225* (2006.01)
*B60Q 1/124* (2006.01)

(52) U.S. Cl. ........................ 353/122; 353/30; 353/101; 353/121; 353/85; 353/87; 396/79; 396/102; 396/103; 396/104; 348/207.99; 362/233

(58) Field of Classification Search .................. 353/30, 353/101, 121, 85, 87, 122; 359/823; 396/79–80, 396/82, 102–104; 348/135, 207.99; 362/233
See application file for complete search history.

(56) References Cited

U.S. PATENT DOCUMENTS 3,706,914 A 12/1972 Van Buren .................. 315/316
3,898,643 A 8/1975 Ettlinger ................. 340/324 A
4,095,139 A 6/1978 Symonds et al. ........... 315/153
4,244,006 A * 1/1981 Kitahara et al. ......... 348/211.6
4,697,227 A 9/1987 Callahan ..................... 362/233
5,782,548 A * 7/1998 Miyashita .................... 353/42
5,828,485 A 10/1998 Hewlett ....................... 359/291
5,829,868 A 11/1998 Hutton ........................ 362/276
6,057,958 A 5/2000 Hunt ........................... 359/291
6,219,093 B1 * 4/2001 Perry ......................... 348/135
6,219,099 B1 * 4/2001 Johnson et al. ............. 348/383
6,246,446 B1 * 6/2001 Heimbuch et al. .......... 348/750
6,249,091 B1 * 6/2001 Belliveau .................... 315/312
6,331,756 B1 * 12/2001 Belliveau .................... 315/316

(Continued)

FOREIGN PATENT DOCUMENTS

JP 200241874 A * 9/2000

*Primary Examiner*—W. B. Perkey
*Assistant Examiner*—Magda Cruz
(74) *Attorney, Agent, or Firm*—Conley Rose, P.C.

(57) ABSTRACT

The methods and apparatus for lighting systems provide a camera integral to a particular image projection lighting device (IPLD) to capture the projected image from the particular IPLD. The captured image can then be sent over a communication system to the operator for viewing on a visual display device such as a computer monitor on a central controller. Using the captured image of the projected image as viewed upon the display device, the operator may then command using the central controller the focusing, position or other parameters of the projected image upon the stage or projection surface to the desired value. The captured image may also be used, such as by a central control system, to automatically, and without operator intervention, adjust parameters of the IPLD to desired values.

17 Claims, 5 Drawing Sheets

U.S. PATENT DOCUMENTS 6,483,555 B1 * 11/2002 Thielemans et al. ........ 348/745
6,561,651 B1 * 5/2003 Kubota et al. ................ 353/30
6,717,625 B1 * 4/2004 Thielemans ................. 348/745
6,719,433 B1 * 4/2004 Belliveau .................... 353/122
2002/0093296 A1 7/2002 Belliveau .................... 315/294

* cited by examiner

IMAGE PROJECTION LIGHTING DEVICE AND CONTROL SYSTEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The embodiments of the present invention generally relate to lighting systems that are digitally controlled and to the lighting fixtures used therein, in particular multiparameter lighting fixtures having one or more image projection lighting parameters.

Lighting systems are typically formed by interconnecting, via a communications system, a plurality of lighting fixtures and providing for operator control of the plurality of lighting fixtures from a central controller. Such lighting systems may contain multiparameter light fixtures, which illustratively are light fixtures having two or more individually remotely adjustable parameters such as focus, color, image, position, or other light characteristics. Multiparameter light fixtures are widely used in the lighting industry because they facilitate significant reductions in overall lighting system size and permit dynamic changes to the final lighting effect. Applications and events in which multiparameter light fixtures are used to great advantage include showrooms, television lighting, stage lighting, architectural lighting, live concerts, and theme parks. Illustrative multi-parameter light devices are described in the product brochure entitled "The High End Systems Product Line 2001" and are available from High End Systems, Inc. of Austin, Tex.

Prior to the advent of relatively small commercial digital computers, remote control of light fixtures from a central controller was done with either a high voltage or low voltage current; see, e.g., U.S. Pat. No. 3,706,914, issued Dec. 19, 1972 to Van Buren, and U.S. Pat. No. 3,898,643, issued Aug. 5, 1975 to Ettlinger, both of which are incorporated by reference herein for all purposes. With the widespread use of computers, digital serial communication was widely adopted as a way to achieve remote control; see, e.g., U.S. Pat. No. 4,095,139, issued Jun. 13, 1978 to Symonds et al., and U.S. Pat. No. 4,697,227, issued Sep. 29, 1987 to Callahan, both of which are incorporated by reference herein for all purposes.

In 1986, the United States Institute of Theatre Technology ("USITT") developed a digital communications system protocol for multiparameter light fixtures known as DMX512. Basically, the DMX512 protocol is comprised of a stream of data which is communicated one-way from the control device to the light fixture using an Electronics Industry Association ("EIA") standard for multipoint communications know as RS-485.

A variety of different types of multiparameter light fixtures are available. One type of advanced multiparameter light fixture, which is referred to herein as an image projection lighting device ("IPLD"), uses a light valve to project images onto a stage or other projection surface. A light valve, which is also known as an image gate, is a device, such as a digital micro-mirror ("DMD") or a liquid crystal display ("LCD"), that forms the image that is to be projected. Various IPLD's and IPLD systems are described in U.S. patent application Ser. No. 10/190,926, filed Mar. 4, 2002, U.S. patent application Ser. No. 10/206,162, filed Jul. 26, 2002, and U.S. patent application Ser. No. 10/290,660, filed Nov. 8, 2002, all of which are incorporated by reference herein for all purposes.

In their common application, IPLD's are used to project their images upon a stage or other projection surface. Control of the IPLD's is affected by an operator using a central controller that may be located several hundred feet away from the projection surface. In many applications, the stage, or projection surface, is also elevated such that, with the central controller located at a significant distance from the stage, the operator can not see the image projected upon the stage. This lack of vision may prevent effective control of the projected images from the central controller. For example, the operator may not be able to set the desired focus parameter value of the image, or set the projected image to the desired position, upon a remote projection surface because the operator may not be able to see the projection surface from the central controller location.

In a given application, there may be up to hundreds of IPLD's used to illuminate the projection surface, with each IPLD having many parameters that may be adjusted to create a scene. Once a scene is constructed, the operator of the central controller can adjust the parameters of the many IPLD's in order to construct a new scene. The work of adjusting or programming the parameters to the desired values for the many IPLD's to create a scene can take quite some time. Many times the scenes are created by the operator during a rehearsal and the time for programming the many IPLD's has limitations.

Since the operator of the control system often can not see the projected images from the central controller location, the desired focus, position or other parameters of the IPLD's may be set with the operator having a human spotter in proximity to the stage or projection surface. The spotter can communicate verbally, such as over a radio, to give directions to the operator as to when the desired image or effect is achieved. In certain applications, a portable remote control unit of the central controller can be used by the operator in close proximity to the stage or projection surface for setting the focus, position or other parameter of the image projected upon projection surface. Although this eliminates the spotter, the operator can not see the projected images from the central controller, making last minute adjustments difficult.

Thus, there remains a need in the art for methods and apparatus for improving the control system of a remotely located IPLD. The embodiments of the present invention are directed to methods and apparatus for improved lighting devices and complimentary control systems that seek to overcome the limitations of the prior art.

SUMMARY OF THE PREFERRED EMBODIMENTS

The methods and apparatus of certain embodiments of the invention provide a camera integral to a particular image projection lighting device (IPLD) in order to capture the projected image from the particular IPLD. The captured image can then be sent over a communication system to the operator for viewing on a visual display device such as a computer monitor on a central controller. Using the captured image of the projected image, as viewed upon the display device, the operator may then, using the central controller, adjust the focusing, position, or other parameters of the projected image upon the stage or projection surface to the desired value. The captured image may also be used, such as by a central control system, to automatically, and without operator intervention, adjust parameters of the IPLD to desired values.

In a first embodiment, a lighting system includes an IPLD with an integral camera, a central controller, and a communications system. The system is used to provide a visual image for visualization, by an operator on a visual monitoring device located at the central controller, of the projected image that is projected upon a projection surface by a particular IPLD. The visual image as provided by the visual monitoring device is viewed by an operator of the central controller and used as a visual feedback aid as to the parameter settings of a particular IPLD. The visual feedback is then used by the operator to provide parameter adjustment commands to the particular IPLD from the central controller over the communications system.

In a second embodiment, a lighting system includes an IPLD with a camera, a central controller, and a communications system. The system is used to provide a visual image for visualization, by an operator from a visual monitoring device located at the central controller, of the projected image that is projected upon a projection surface by a particular IPLD. The operator uses the central control system to send camera focus commands over the communication system to a particular IPLD to adjust the camera focus for the best focus of the projected image projected by the particular IPLD upon the projection surface. The camera focus command values are used by the microprocessor of the particular IPLD to automatically adjust the focus of the projection focusing lens in order to focus the projected image on the projection surface. In this way, the operator of the central controller need only adjust the focus of the camera of the particular IPLD on the projection surface in order to automatically affect the correct focus of the projected image on the projection surface.

In a third embodiment, an IPLD includes a camera equipped with an auto focusing system for adjusting the focus of the camera to best capture an image of the projection surface in the camera's field. As the camera auto focusing system affects a change in focus, the camera communicates focusing values that are sent to the microprocessor of the IPLD where they are used to adjust the projection focusing lens of the IPLD to provide for the best focus of the projected image on the projection surface.

In a fourth embodiment, an IPLD includes a camera equipped with a focusing system for adjusting the focus of the camera to best capture an image in the camera's field. As the projection focusing lens is adjusted to provide for a desired focus on the particular projection surface, the projection focusing values are used by the processor of the IPLD to calculate camera focusing values. The camera focusing values are then sent to the camera to obtain a focus of the captured images on the projection surface.

In a fifth embodiment, an IPLD includes a camera equipped with a focusing system for adjusting the focus of the camera to obtain a desired focus of the captured camera images from the projection surface. The captured camera image data is sent to the processor of the IPLD, which analyzes the camera image data to provide focus values that bring the projected image into focus on the particular projection surface.

Thus, the present invention comprises a combination of features and advantages that enable it to improve the controllability and operability of a lighting system having one or more IPLD's. These and various other characteristics and advantages of the present invention will be readily apparent to those skilled in the art upon reading the following detailed description of the preferred embodiments of the invention and by referring to the accompanying drawings.

BRIEF DESCRIPTION OF THE DRAWINGS

For a more detailed understanding of the preferred embodiments, reference is made to the accompanying Figures, wherein.

DETAILED DESCRIPTION OF THE PREFERRED EMBODIMENTS

Figure 1:
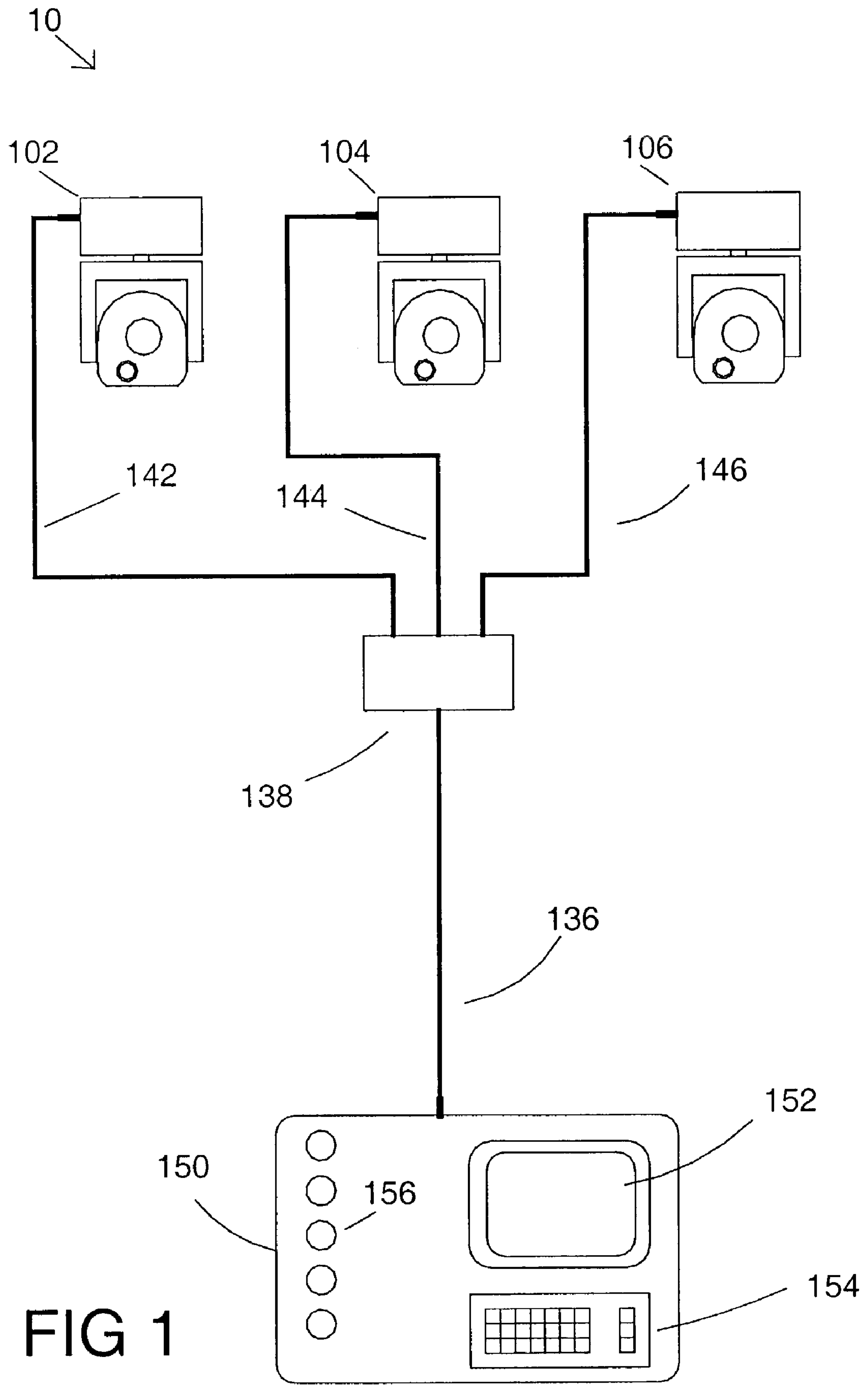
FIG. 1 is a schematic view of one embodiment of an image projection lighting system.

In the description that follows, like parts are marked throughout the specification and drawings with the same reference numerals, respectively. The drawing figures are not necessarily to scale. Certain features of the invention may be shown exaggerated in scale or in somewhat schematic form and some details of conventional elements may not be shown in the interest of clarity and conciseness. The present invention is susceptible to embodiments of different forms. There are shown in the drawings, and herein will be described in detail, specific embodiments of the present invention with the understanding that the present disclosure is to be considered an exemplification of the principles of the invention, and is not intended to limit the invention to that illustrated and described herein. It is to be fully recognized that the different teachings of the embodiments discussed below may be employed separately or in any suitable combination to produce the desired results.

In particular, various embodiments of the present invention provide a number of different methods and apparatus for operating and controlling multiple IPLD lighting systems. The concepts of the invention are discussed in the context of IPLD lighting systems but the use of the concepts of the present invention is not limited to IPLD systems and may find application in other lighting and other visual systems where control of the system is maintained from a remote location and to which the concepts of the current invention may be applied.

FIG. 1 shows an apparatus 10 comprised of a central controller 150, a communications interface 138, an IPLD (image projection lighting device) 102, an IPLD 104, and an IPLD 106. The IPLDs 102, 104, and 106 are electrically connected by communications lines 142, 144, and 146, respectively, to the communication interface 138. The communications interface 138 is electrically connected to the central controller 150 by communications line 136. The central controller 150 may be a dedicated control console or a computer system. The central controller 150 has a visual display monitor 152, a keypad entry device 154 and entry adjuster devices 156.

Three IPLD's, 102, 104, and 106 are shown for simplification. However, many more IPLD's, for example thirty IPLD's, each one like any one of 102, 104, and 106 could be used in a lighting system or apparatus, such as apparatus 10. The communication interface 138 may be a router or hub as known in the communications art.

Figure 2:
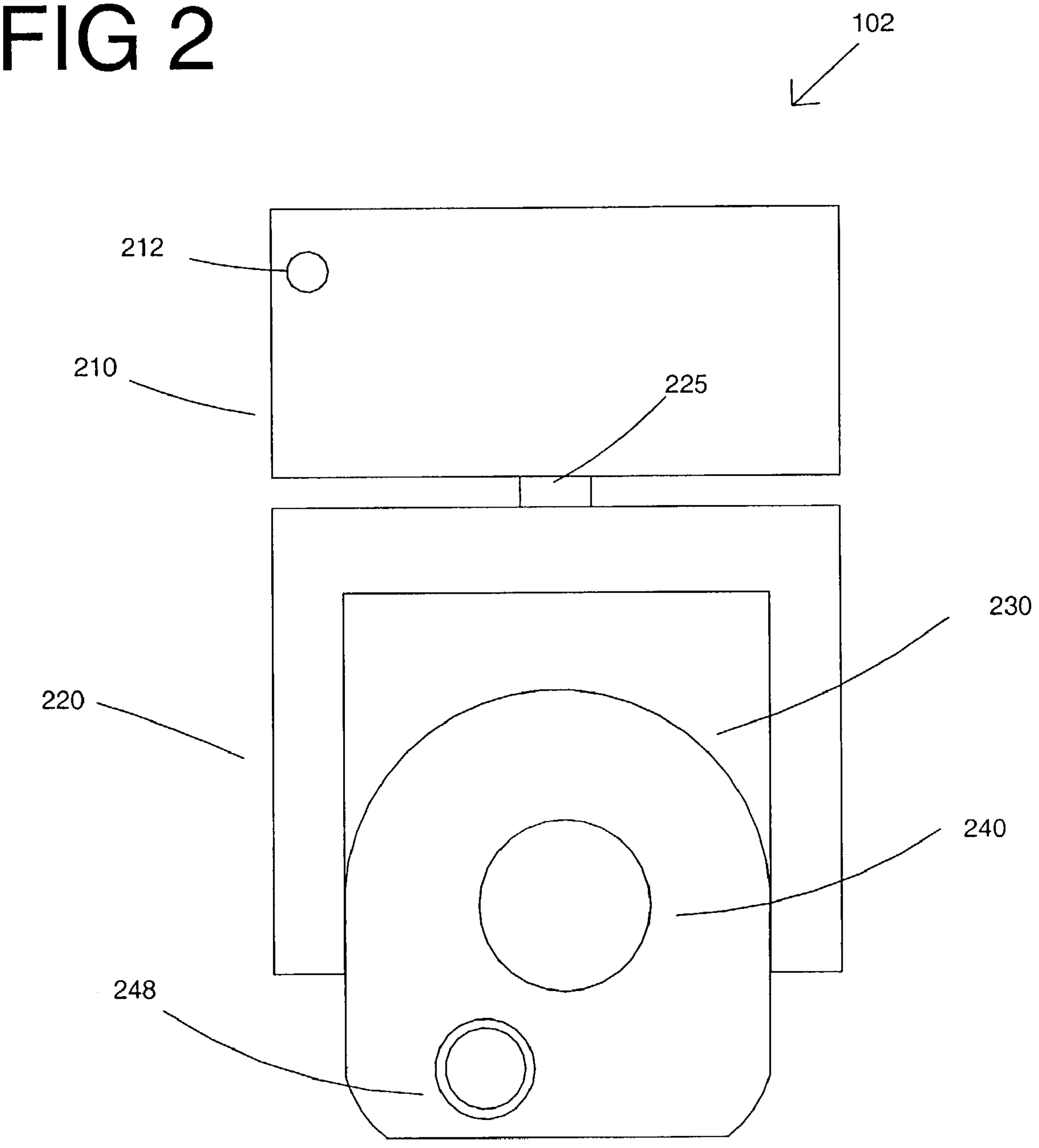
FIG. 2 is a front view of an image projection lighting device for use with the embodiment of FIG. 1.

FIG. 2 shows a front view of one embodiment of IPLD 102, including a base or electronics housing 210, a yoke 220, and a lamp housing 230. The IPLDs 104 and 106 of FIG. 1 may each be identical to the IPLD 102 of FIG. 2.

The base housing 210 of the IPLD 102 includes a connection point 212 for electrically connecting a communications line, such as communications line 142 shown in FIG. 1. The yoke 220 is physically connected to the housing 210 by a bearing 225 which allows the yoke 220 to pan or rotate in relation to the electronics housing 210. The lamp housing 230 is rotatably connected to the yoke 220. The lamp housing 230 typically contains optical components. An exit aperture 240 is shown for projecting light from a main projection lamp inside the lamp housing 230. An aperture 248 is shown for allowing a camera 364 (as shown in FIG. 3), within the lamp housing 230 to receive and capture images.

Figure 3:
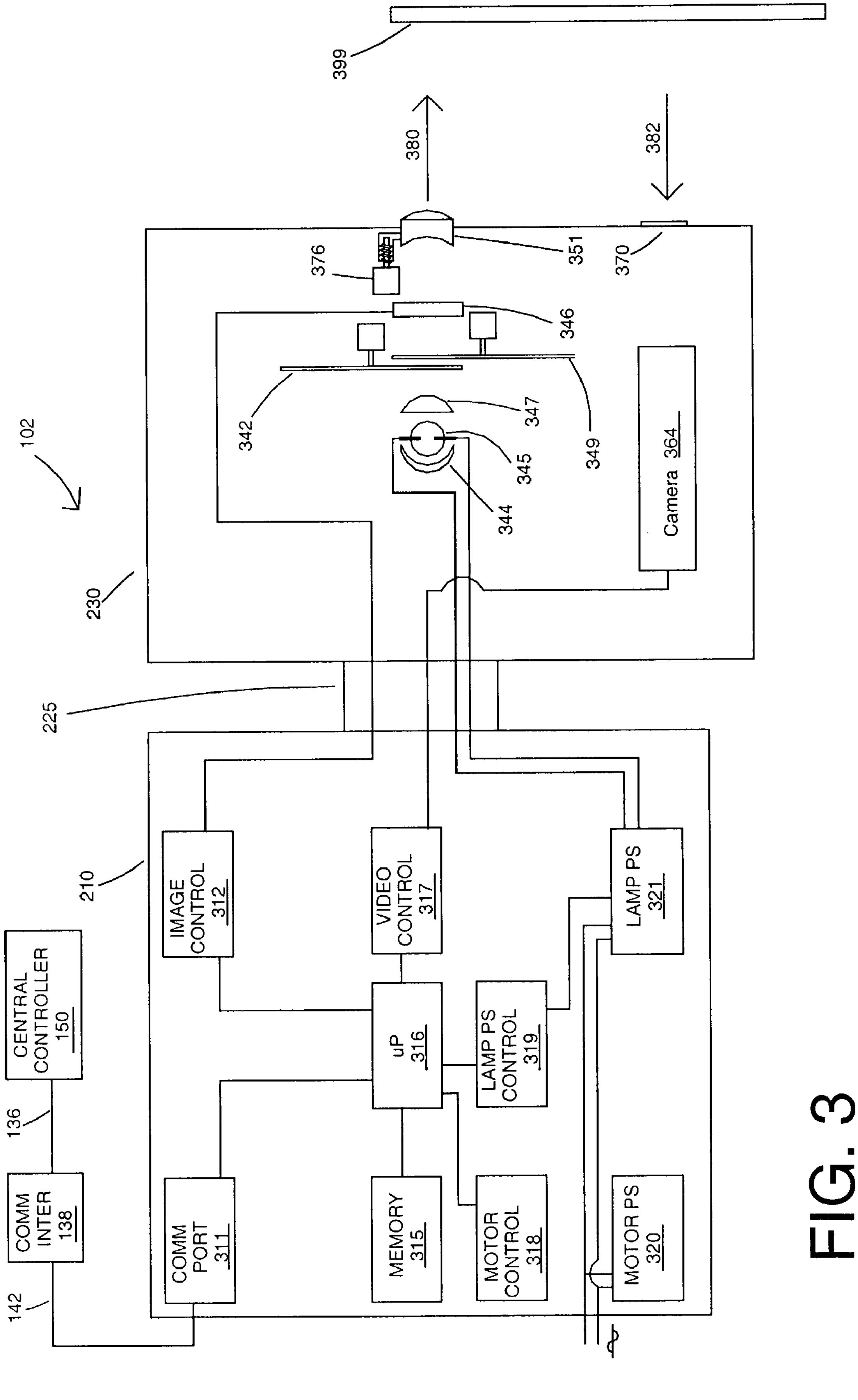
FIG. 3 is a block diagram showing components within a base housing and within a lamp housing of an image projection lighting device for use with the embodiment of FIG. 1.

FIG. 3 is a block diagram showing components within or part of the base housing 210 and within or part of the lamp housing 230 of the IPLD 102. FIG. 3 also shows the central controller 150.

The components of the base housing 210 include a communication port (shown as "comm port") 311, image control 312, memory 315, microprocessor 316, video control interface 317, motor control 318, lamp power supply control 319, motor power supply 320, and lamp power supply 321.

The components of the lamp housing 230 include a filter assembly 342, a light collection mirror 344, a main projection lamp or main projection light source 345, a light valve 346, a condensing lens 347, a filter assembly 349, a projection focusing lens 351, a motor lead screw assembly 376 for focusing the lens 351, and a window aperture 370.

The central controller 150 outputs address and control commands over a communications system which may include communications interface 138 of FIG. 1. The communications interface 138 is connected to the communication port 311 by communications line 142 as shown in FIG. 3. The image control interface 312 of the electronics housing 210 provides control signals to the light valve 346 in the lamp housing 230. Although the central controller 150 and the communications interface 138 are shown connected by communication wires 138 and 142 to IPLD 102, the communication wires 138 and 142 could be substituted with a wireless system using infrared, ultrasonic, or radio-frequency transmissions.

The microprocessor 316 in the electronics housing 210 provides control signals to the image control 312. The microprocessor 316 is shown electrically connected to the memory 315. The memory 315 stores the computer software operating system for the IPLD 102 and possibly different types of content used to form images at the light valve 346 of the lamp housing 230.

The light valve 346 may preferably be a transmissive type light valve where light from the projection lamp is directed to the light valve to be transmitted through the light valve to the lens. In alternative embodiments, the light valve may also be a reflective light valve where light from the main projection lamp is directed to the light valve to be reflected from the light valve to the lens.

The motor control 318 is electrically connected to the motors. The electrical connection to the motors is not shown for simplification. The motors may be stepping motors, servomotors, solenoids or any other type of actuators. The motor control interface 318 provides the driving signals to the motors used with filter assemblies 342 and 349. Filter assemblies 342 and 349 may be rotatable aperture wheels. The aperture wheels, if used for filter assemblies 342 and 349, may be used to vary color or pattern parameters.

The motor control 318 is electrically connected to receive control signals from the microprocessor 316. Two power supplies 320, 321 are shown in FIG. 3. A motor power supply 320 is shown for supplying energy to the motors and a lamp power supply 321 is shown for supplying power to the main projection light source or lamp 345. A lamp power supply interface 319 is electrically connected to the microprocessor 316 to receive control signals from the microprocessor 316 and signals are sent from the lamp power supply interface 319 to the lamp power supply 321 for controlling the main projection light source or lamp 345.

The IPLD 102 may include at least two different housings, such as the base or electronics housing 210 and the lamp housing 230 to facilitate remote positioning of the lamp housing 210 in relation to the base 230. The lamp housing 230 contains the optical components used to project light images upon a stage or projection surface 399 from projection focusing lens 351 in the direction of arrow 380, outwards from the IPLD 102. The lamp housing 230 may be connected to a bearing mechanism 225 that facilitates pan and tilting of the lamp housing 230 in relation to the base or electronics housing 210. The bearing mechanism 225 is shown simplified. The motors that would be used for pan and tilt are not shown for simplification.

The window aperture 370 of the lamp housing 230 is shown in FIG. 3, for allowing input light for the reception of images traveling in the direction of arrow 382 from the projection surface 399 to be captured by the camera 364. The camera 364 may be a type of camera (known in the art) that receives light images with a contained camera sensor and converts the light images into electronic image data or signals. The camera 364 may be of a type, as known in the art, which may be constructed of only a camera sensor or the camera 364 may contain other optical components in the camera sensor optical path along with suitable control and communication electronics.

The main projection lamp 345 has its light energy collected by the collecting mirror 344 and a condensing lens 347. The collected light from the main projection lamp 345 passes through the condensing lens 347. Next, the light passes though filter assemblies 342 and 349 and through the light valve 346. Finally, the light passes through the projection focusing lens 351 and travels in the direction of the arrow 380 towards the projection surface 399.

The video control interface 317 of the electronics housing 210 sends image data received from the camera 364 to the microprocessor 316. The video control interface 317 may also be used to send command signals and value data to and from the microprocessor 316 and to and from the camera 364. The video control interface may be a separate interface or processing system or may be part of the processor 316. The microprocessor 316 may send this image data or signals to the communications port 311 for transmission back to the central controller 150 or to other IPLDs on the communications system or apparatus 10, such as IPLDs 104 and 106 connected to communication interface 138 in FIG. 1. The communications port 311 may be a part of the processor 316. The communications port 311 can be any device capable of receiving the communication sent over the communication system.

The other IPLDs on the network or apparatus 10, such as IPLD 104 and IPLD 106, may use the image data received from the IPLD 102 by projecting the images that were captured by the camera 364 and thus originated at IPLD 102. The general capturing of images and sending image data to other lighting devices is described in detail in pending U.S. patent application Ser. No. 10/090,926, to Richard S. Belliveau, one applicant herein, Publication No. 2002-0093296, filed on Mar. 4, 2002, titled "Method, Apparatus And System For Image Projection Lighting", which is incorporated by reference herein for all purposes.

Figure 4:
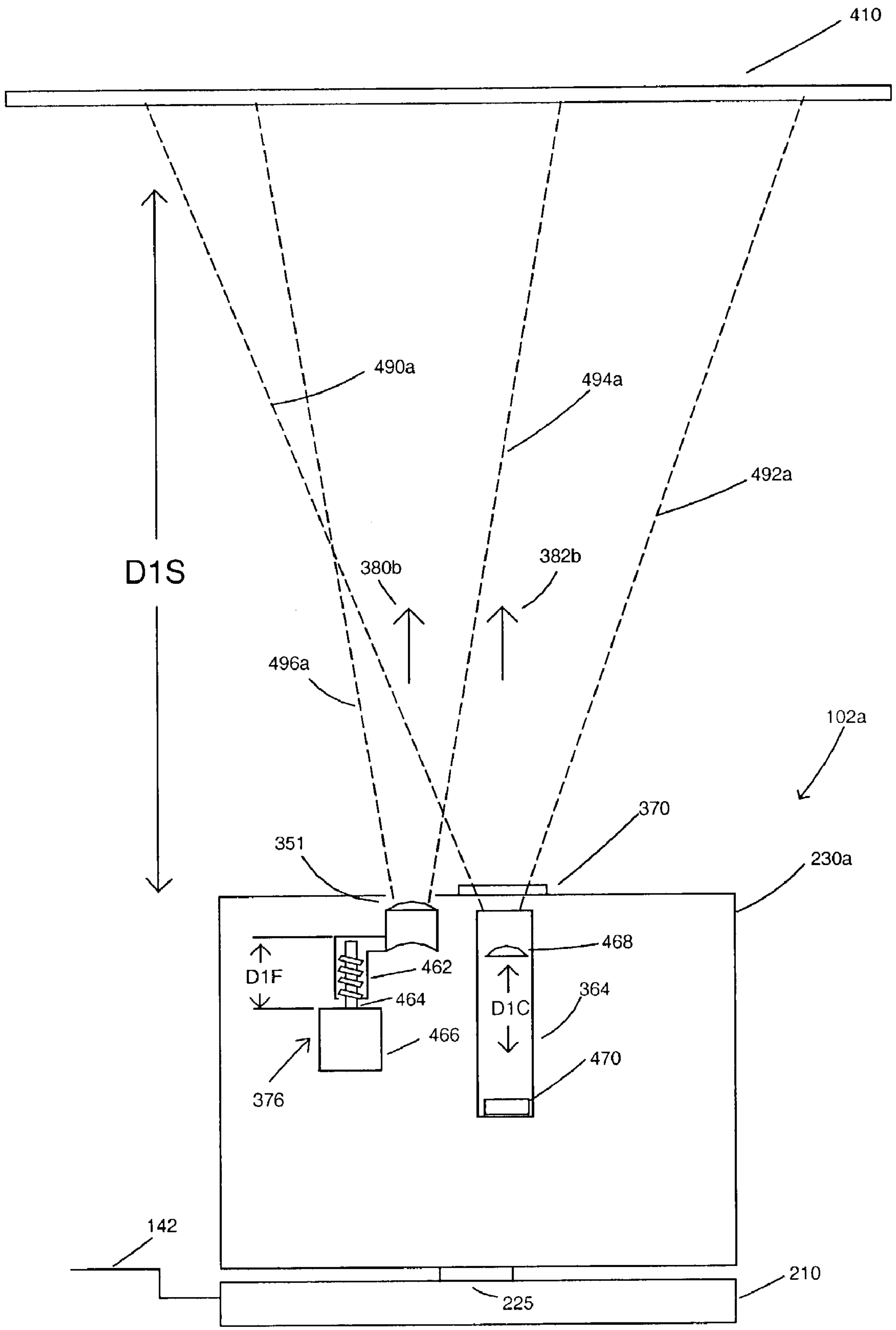
FIG. 4 is a schematic diagram showing a projection surface at a first distance from an image projection lighting device in accordance with an embodiment of the present invention.

FIG. 4 shows a projection surface 410 at a distance of approximately D1S from an image projection lighting device lamp housing 230*b* of (IPLD) 102*a*. Dotted lines 490*a* and 492*a* show the camera field outside of the lamp housing 230*a*. The camera field, shown by 490*a* and 492*a*, is established by a camera optical path 382*b* of the camera 364. Dotted lines 494*a* and 496*a* show the projection field outside of the lamp housing 230*a*. The projection field is established by a projection lamp optical path 380*b*. The lamp housing 230*a* is similar to the lamp housing 230 of FIG. 3 except that some of the optical components are omitted for simplification. A focusing lens 468 is shown as a component of the camera 364. The camera may have only one sensor capable of capturing visual images and converting them into electronic signals or the camera may contain other components in the camera's housing. The camera's sensor is shown as 470. A distance D1F is the distance from the focusing lens 351 to the motor 466.

A bearing 225 is shown, which may be identical to the bearing 225 of FIGS. 2 and 225 of FIG. 3. An electronics housing 210 is shown which may be identical to the electronics housing 210 of FIG. 3. A communications cable 142 is shown that may be identical to the communications cable 142 of FIG. 1 and FIG. 3. A motor lead screw assembly 376 is shown for focusing the lens 351. The motor lead screw assembly 376 is broken down into individual components, with motor 466 shown with a lead screw shaft 464 threaded into a power nut bracket 462. The power nut bracket 462 is attached to the focusing lens 351. The lens 351 may be identical to the lens 351 of FIG. 3. The camera 364 may be identical to the camera 364 of FIG. 3 and is shown with window 370 that may be identical to the window 370 of FIG. 3.

Figure 5:
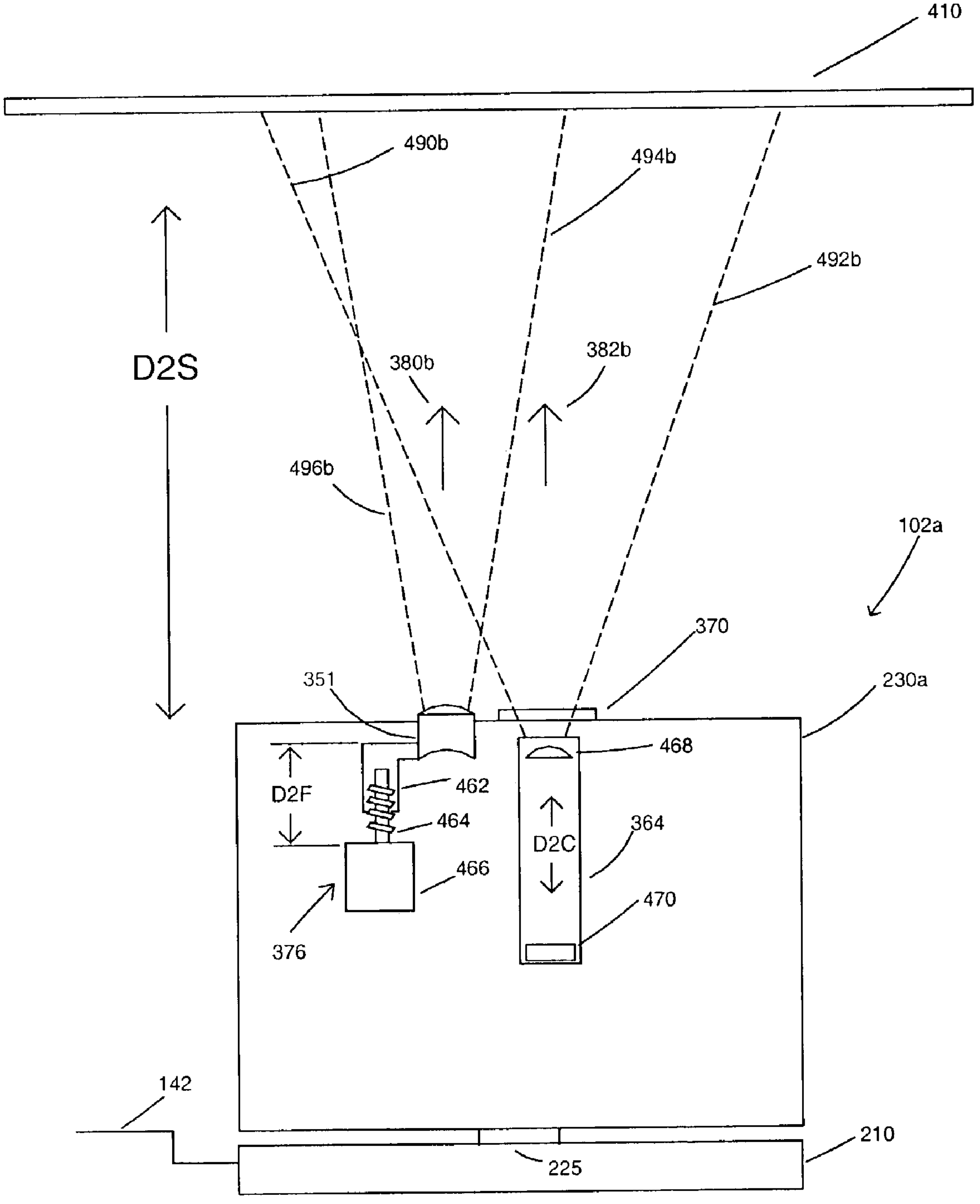
FIG. 5 is a schematic diagram showing a projection surface at a second distance from an image projection lighting device in accordance with an embodiment of the present invention

FIG. 5 shows a projection surface 410 at a distance of approximately D2S from IPLD 102*a*. Dotted lines 490*b* and 492*b* show the camera field outside of the lamp housing 230*a*. The camera field is established by the camera optical path 382*b*. Dotted lines 494*b* and 496*b* show the projection field outside of the lamp housing 230*a*. The projection field is established by the projection lamp optical path 380*b*. The lamp housing 230*a* is similar to the lamp housing 230 of FIG. 3 except that some of the optical components are omitted for simplification. A focusing lens 468 is shown as a component of the camera 364. The camera may have only one sensor capable of capturing visual images and converting them into electronic signals or the camera may contain other components in the camera's housing.

The camera's sensor is shown as 470. A bearing 225 is shown that may be identical to the bearing 225 of FIGS. 2 and 225 of FIG. 3. An electronics housing 210 is shown which may be identical to the electronics housing 210 of FIG. 3. A communications cable 142 is shown which may be identical to the communications cable 142 of FIG. 1 and FIG. 3. A motor lead screw assembly 376 is shown for focusing the lens 351. The motor lead screw assembly 376 is broken down in to individual components, with motor 466 shown with a lead screw shaft 464 threaded into a power nut bracket 462. The power nut bracket 462 is attached to the focusing lens 351. The lens 351 of FIG. 5 may be identical to the lens 351 of FIG. 3.

A distance D2F is the distance from the projection focusing lens 351 to the motor 466. A camera 364 may be identical to the camera 364 of FIG. 3 and is shown with a window 370 that may be identical to the window 370 of FIG. 3.

Referring back to FIG. 1, lighting system 10 is controlled by an operator (not shown) using the central controller 150 and input devices 154 and 156 to input commands to the lighting devices (IPLD's) 102, 104 and 106. While only three IPLD's are shown, up to hundreds of IPLD's may be used with the lighting system 10. The commands input to the central controller 150 by the operator are used to adjust the parameters of the IPLD's. A communications line 136 is connected to a communications interface 138 (which may be a hub or switch as known in the communications art). The communications interface relays the commands sent by the central controller 150 over the communications lines 142, 144 and 146 to IPLD's 102, 104 and 104 respectively.

The commands are sent from the central controller to adjust the position of the lamp housing 230 of FIG. 2 in relation to the yoke 220 (this may be known in the art as tilting the lamp housing). Also the lamp housing 230 and yoke 220 may be commanded by the central controller to change their position relative to the base or electronics housing 201 (this may be known in the art as panning the lamp housing). The commands from the central controller to the IPLD's may be used to adjust other parameters of the individual IPLD's such as image, color, focus, and intensity, as well as other parameters of the projected light.

When the operator and the central control system 150 are located a great distance from the IPLD's 102, 104 and 106 and the projection surface 410, the operator may not be able to see in order to correctly adjust the parameters of the IPLD's upon the projection surface. For example, if the operator can not see the projected image, the operator may not know if the position of the projected image on the projection surface is correct. If the operator can not see the projected image, it is difficult for the operator to set the desired focus of the IPLD upon the projection surface.

In order to adjust the parameters of a particular IPLD, the operator first selects, via input keypad 154, the particular IPLD to command. This is done by sending an operating address over the communication system to be recognized by only the particular IPLD. The action of sending addresses and commands over a communication system from the central controller to the IPLD's is known in the art. Once the particular IPLD has been selected, the operator next chooses the parameter to be adjusted. If a command is sent by the operator to a particular IPLD (such as IPLD 102) to adjust a parameter by inputting to the keypad 154 or adjuster devices 156, the communications port 311 of IPLD 102 receives the command and forwards the command to the processor 316. The processor receives the commands and determines the necessary action by operating with the memory 315 to determine the correct control signals to be sent to adjust the parameter.

The parameter may be the image parameter. In the case of an image parameter, the processor 316 may send control signals to the image control device 312 that in turn sends the appropriate signals to the light valve 346 to vary the image parameter (change the look of the projected image). An image parameter is the parameter that controls the light valve or light valves. The light valve or valves can also be used to vary an intensity (brightness) parameter by controlling the amount of light available to be projected on the stage or projection surface.

If the command from the central controller 150 is a command to vary the position of the lamp housing in relation to the base for remotely controlling the position of the projected image on the projection surface, the communications port 311 receives the command and forwards the command to the processor 316. The processor receives the commands and determines the necessary action by operating with the memory 315 to determine the correct control signals to be sent to the motor control interface 318, which, in turn, sends the correct driving signals over wires (not shown) to drive the motors for pan and tilt (not shown).

If the command from the central controller 150 is a command to vary the focus of the projection focusing lens 351, the communications port 311 receives the command and forwards the command to the processor 316. The processor receives the commands and determines the necessary action by operating with the memory 315 to determine the correct control signals to be sent to the motor control interface 318 which in turn sends the correct driving signals over wires (not shown) to drive the focus motor and lead screw assembly 376 which in turn linearly moves the focusing lens to achieve the best focus of the projected image for the distance required to the projection surface.

If the focus parameter of a particular IPLD is selected for adjustment by the operator of the lighting system 10 using the central controller 150, the visual display device, such as a computer monitor 152, cooperatively displays the images of the projected images on the projection surface as captured by the camera 364. The camera 364 is preferably integrated into the IPLD 102 so that it can capture the projected images as created with the light valve 346 and the main projection lamp 345. The optical path of the main projection lamp used for producing the light for the projected images is shown in the direction of arrow 380 of FIG. 3.

The optical path of the camera 364 used for capturing the projected images is shown in the direction of arrow 382. The area of the projection surface image that the camera is able to capture is determined by the camera field and the camera field is created by the camera optical path. The camera field is shown in FIG. 4 by dotted lines 490*a* and 492*a*. The cameras optical field at the projection surface 410 of FIG. 4 captures more than the entire projection field at the projection surface 410. The projection field is shown if FIG. 4 by dotted lines 494*a* and 496*a*. The projection field is created by the main projection lamp optical path as shown by arrow 380*b*. It is preferable to have a camera field larger than the projection field so that not only the entire projection field on the projection surface is captured by the camera but also some of the surrounding areas of the projection surface are captured.

When the operator of the central control system 150 selects an IPLD to adjust a parameter (such as IPLD 102 of FIG. 1 or IPLD 102*a* of FIG. 4), the action of selecting the IPLD, by input to an input device such as 154 or 156 of the central control system, cooperatively provides the cameras captured image of the projection surface projected upon by IPLD 102 onto the visual display device 152.

The communication system used with lighting system 10 of FIG. 1 may send command and address signals from the central controller 150 of FIG. 1 to the IPLDs 102, 104 and 106. The IPLDs 102,104 and 106 may send captured camera video information as requested by the central controller to the central controller as explained in detail in pending United States patent application titled "Method, Apparatus And System For Image Projection Lighting", inventor Richard S. Belliveau, Publication No. 2002-0093296, Ser. No. 10/090,926, filed on Mar. 4, 2002, incorporated by reference herein. That application describes prior art IPLDs with cameras and communication systems that allow camera content, such as in the form of digital data, to be transferred between prior art IPLDs.

During the programming of the IPLD's for an event or rehearsal, the operator of the central controller 150 of FIG. 1 need only select the particular IPLD from a plurality of IPLD's. The selection of the particular IPLD is accomplished by sending the appropriate address, as input by the operator of the central control system 150 of FIG. 1, to be recognized by a particular IPLD. The particular IPLD recognizing the correct address can respond by cooperatively sending the captured camera images back over the communication system to be received by the central controller. The central controller receives the captured images from the selected IPLD and electronically provides the images to the visual display device or computer monitor 152. In this way, the camera captured images from a particular IPLD that has been selected by the operator of the central control system are sent automatically back to the central controller to be displayed on the visual display device. The triggering of the event to view the captured images of a selected IPLD only requires the selection of the particular IPLD by the operator of the central controller.

The triggering of the event to view the captured images of a selected IPLD on the visual display device of the central controller may also be actuated after the IPLD has been selected by the central controller. A known input entry device such as the keypad 154 or adjuster devices 156 available on the central controller 150 of FIG. 1 may at any desired time (when correctly inputted or adjusted by the operator) provide the operator with the camera captured images of the selected IPLD to be viewed on the visual display device 152 of FIG. 1.

The operator uses the camera captured images from the IPLD as displayed by the display device 152 of FIG. 1 as an aid to see the projected images on the projection surface, even though the central controller may be located at a distance or location where the operator of the central controller can not see the images projected on the projection surface directly. By using the captured camera images from the selected IPLD as displayed on the central controller display device or computer monitor, the operator can adjust parameters of the selected IPLD.

The operator can see (by looking at the visual display device of the central controller) if the focus of the projected image on the projection surface needs to be adjusted, and if it does, the operator can input commands through the central controller to adjust the focus lens of the particular IPLD. The operator can see by looking at the visual display device of the central controller if the position of the projected image on the projection surface is located in the desired position as determined by the operator. If an adjustment to the projected image of the selected IPLD is needed, the operator sends the appropriate position commands to the selected IPLD to adjust position (or pan and tilt) to place the projected image in the desired location on the projection surface.

The operator of the lighting system 10 of FIG. 1 of the invention may adjust several different parameters of a selected IPLD with the central controller by viewing on the visual display of the central controller the captured camera images of the projected of images on the projection surface as projected by the selected IPLD. Adjustable parameters of a selected IPLD that may be adjusted by the operator (when viewing the captured camera image of the selected IPLD on the visual display device) may include focus, position, color adjustment, image, and intensity. For adjusting position it is not necessary for the selected IPLD to be actually projecting.

The captured camera images of the projection surface without the projected image may be all that is needed by the operator to estimate where the projected images are going to appear on the projection surface and position the IPLD to the best estimated position for the desired location. The captured camera image may also be used to simply check or confirm by the operator that the selected IPLD is operational and performing the desired parameters on the projection surface.

FIG. 4 shows a lamp housing 230*a* similar to the lamp housing 230 of FIG. 3. Lamp housing 230*a* of FIG. 4 has been simplified by not showing all of the components shown in the lamp housing 230 of FIG. 3. The focusing lens 351 of FIG. 4 is shown and is similar to the focusing lens 351 of FIG. 3. Different means for mechanizing the projection focusing lens 351 for remote control of focus are known in the art. The means shown in FIG. 4 shows the focusing lens 351 attached to a power nut 462 that is in turn linearly driven by lead screw shaft 464 that is attached by any suitable means to the motor 466. The motor 466 is fixed to the lamp housing 230*a* by any suitable means. As the lead screw 464 is rotated, the power nut 462 with the focusing lens 351 moves towards or away from the motor 466.

The movement of the lens 351 by the motor lead screw drive allows remote control of the focus of the lens 351. The motor 466 is driven by control signals from the motor control interface 318 of FIG. 3. The motor control interface 318 of FIG. 3 receives control signals from the processor 316. The communications port 311 of FIG. 3 receives commands over the communication system from the central controller 150 of FIG. 1, and the communications port 311 passes these control commands to the processor 316 for remote control of the projection focusing lens 351. The remote control of a focus lens in a multiparameter light by a central controller is known in the art.

Motor 466 of FIG. 4 may be a stepping motor or a servo motor or any actuator that can be incrementally controlled by the processor 316 of FIG. 3. The incremental control of the motor 466 by known values allows the operator of the central controller 150 to precisely position the projection focusing lens 351 with values. For example, if the projection focusing lens 351 of FIG. 4 needs to move 8 mm from the motor 466 to obtain the proper focus of the image on the projection surface 410, a value of "8" may be selected from the central controller 150. The focus value change commands sent from the central controller 150 to control the projection focus parameter as received by the image projection lighting device 102 controls the projection focusing lens 351 distance D1F of FIG. 4 and D2F of FIG. 5.

The camera 364 of FIG. 4 includes camera sensor 470 and focusing lens 468. A distance marked as D1C indicates the distance of the focusing lens 468 to the sensor 470. The correct value of the distance required from the focusing lens 468 to the camera sensor 470 to bring the image on the projection surface 410 into the desired focus is shown as D1C.

The distance between the camera focusing lens 468 and the sensor 470 will vary with the distance of the projection surface 410 to the lamp housing 230*a*. It is possible to establish a documented relationship where a known distance from the lens 468 to the sensor 470 can result in a desired focus at a known distance to the projection surface. FIG. 5 shows the same invention of FIG. 4 but with the distance D2S to the projection screen 410 reduced from that of FIG. 4. As the distance D2S of FIG. 5 is reduced over that of D1S of FIG. 4, the other distances are increased such as D2F and D2C of FIG. 5 over that of D1F and D1C of FIG. 4.

There can be a documented relationship between D1S (distance to the projection surface from the lamp housing 230*a*) of FIG. 4 and values of D1C (the camera focus value) and D1F (the projection focus value). This documented relationship can be stored in the memory 315 of FIG. 3 of the IPLD 102. The documented relationship can be a lookup table or a mathematical formula like a ratio.

For example, if in FIG. 4 D1S is 1600 cm, D1C is 8 mm and D1F is 4 mm and in FIG. 5 if D2S is 800 cm, D2C is 16 mm and D2F is 8 mm we can find that the projection focusing value is 50% of the camera focusing value. Or we could establish that the camera focusing value would be 2× the projection focusing value. The relationship of the camera focusing value and the projection focusing value can be documented in the memory 315 as a ratio.

It may not always be easy to come up with a simple ratio for the camera focusing lens and the projector focusing lens. In this case a lookup table can be used to provide the documented relationship in the memory 315. For each particular distance to the projection surface such as D1S of FIG. 4, a camera focusing value D1C and a projection focusing value D1F are documented. By documenting several particular projection surface distances and the values required for camera focusing and projection focusing at those particular projection surface distances, a relationship of the camera focusing values and the projection focusing values can be documented in the memory 315.

If the documented relationship is kept in the memory of the IPLD such as memory 315 of FIG. 3, then the processor can use this relationship to automatically adjust the projection focusing lens 351 of FIG. 4 to a value when the camera focusing lens 470 is moved to a known focus value to achieve the correct focus on the projection surface 410.

The operator of the central controller 150 of FIG. 1 would first select a particular IPLD by sending an address. Next the operator may select the camera focus parameter to be adjusted. Upon selecting the camera focus parameter to be adjusted, the central controller may receive over the communication system the captured camera image of the particular selected IPLD. Upon viewing the captured camera image on the visual display device of the central controller, the operator may next send commands to adjust the focus of the particular IPLD. The operator, using the aid of the visual display device displaying the captured camera images, would use the images to adjust the focus lens 470 of the camera 364.

As the commands are sent to focus the camera, the communications port 311 of the particular IPLD passes the commands to the processor 316. The processor processes the commands to move the focusing lens a specific number of increments as commanded by the operator of the central controller. The processor 316 and the memory 315 keep track of the focusing value, which is needed to focus the camera lens 468, in order to obtain the desired focus of the captured camera image of the projection surface 410 of FIG. 4. and applies this focus value to the documented relationship residing in the memory 315. Next, using the documented relationship, the processor updates the projection focus value D1F to provide the correct focus of the projected image upon the projection surface 410. In this way the operator need only adjust the camera to achieve the focus of the projected image created by the main projection lamp optical system.

Cameras such as the camera 364 of FIG. 4 can be equipped with an auto focus system. The auto focus system on many cameras works by using a digital signal processor (usually as part of the onboard electronics) to look at the data of the captured camera image and automatically adjusts the camera focusing lens to achieve the highest amplitude of the high frequency components of the captured image data. Since sharply focused edges of captured camera images are associated with high frequency peaks in the captured image data, the camera focusing lens (such as lens 468 of FIG. 4) is moved by a motor (not shown) by the digital signal processor to achieve the greatest amount of the high frequency components in the captured image data. The techniques of auto focusing cameras are known in the camera art.

A camera such as camera 364 of FIG. 4 having the ability to auto focus may have a communications output (not shown) for communicating focusing values of the focusing lens such as lens 468 of FIG. 4. The focusing values may be communicated in digital form from the communications output of the camera. One example of a camera that has a communications output capable of providing focusing values is the FCBEX480A manufactured by Sony (trademarked) Corporation of Tokyo, Japan. The communications output of the camera 363 is connected (wiring not shown for simplification) to the video control interface 317 of FIG. 3.

The video control interface 317 may be used both to receive captured camera image data and to send and receive control information such as the focusing values of the camera 364. The video control interface 317 is connected to the processor 316 of FIG. 3 and the video control interface can send to the processor the camera focusing values. The documented relationship of the camera focusing values, projection focusing values and distances to the projection surface can be stored in the memory 315 of FIG. 3 as previously explained.

In this way when the processor 316 receives a particular camera lens focusing value from the video control interface 317, this value can be compared to the documented relationship in the memory 315. The documented relationship in the memory 315 can be used by the processor 316 to send the proper projection focus value control signals to the motor control interface 318 that are used to provide the drive signals to the motor lead screw assembly 376 to move the projection focusing lens 351 to provide the desired focus based upon the camera focusing values. The camera 364 auto focusing system may auto focus both the camera and the projection image to the projection surface.

An example of this embodiment can now be described. An operator of the central controller 150 of FIG. 1 selects a particular IPLD such as IPLD 102 over the communication system by transmitting the correct operating address. Next the operator may command from the central controller 150 a position parameter change and move the lamp housing 230 of FIG. 2 in relation to the base 210. As the camera 364 of FIG. 3 and lamp housing 230 are moved (or positioned) in relation to the base 210, the projection surface 399 is varied. For example, the lamp housing 230 of FIG. 2 (and 3) and the camera 364 of FIG. 3 may be directed to point towards a different part of the stage, an audience member or the performer. As the camera 364 and lamp housing 230 are moved in relation to the base 210, the camera captures the images of the varying projection surfaces and auto focuses on those images so that the captured image of the projection surface will be brought into focus.

An autofocus system will send its focusing values from its communication system over wires (not shown) to the video control interface 312 of FIG. 3. The video control interface 312 forwards the focusing values to the processor 316. The processor 316 next compares the camera focusing value with the documented relationship stored in the memory 315 to determine what the projection focus value should be to bring the projected image into focus on the projection surface 399. Next the processor 316 sends the appropriate signals containing the projection focus values needed to move the projection focusing lens 351 to produce a focused image on the projection surface 399 to the motor control interface 318. The motor control interface 318 responds by sending the correct motor driving signals to the motor lead screw assembly 376 to incrementally move the projection focusing lens 351 to bring the projected image into focus on the projection surface 399. In this way, as the lamp housing 230 is moved in relation to the base 210, and various projection surfaces are captured and auto focused by the camera, focusing values that are produced by the camera are used to affect a change in the projection focusing values, which brings the projected image into focus.

When the documented relationship between the camera focusing values and the projection focusing values in the memory 315 have been established, it is also possible for the processor 316 to use the documented relationship in memory 315 to provide control signals to the video control interface 317, which may be used to provide the necessary camera focusing values to the camera focusing lens to bring the captured camera image into focus based upon the values of the projection focusing lens 351. There are times when the operator of the central controller 150 of FIG. 1 may want to first adjust the projection focusing lens 351 of FIG. 3 of a particular IPLD to bring the projected image into focus on a particular projection surface such as projection surface 410 of FIG. 4.

In this embodiment, the memory 315 and processor 316 of FIG. 3 work together to keep track of the values of the projection focusing values as established by the increments sent to the motor lead screw assembly 376 to move the projection focusing lens 351, and with the use of the documented relationship stored in the memory 315, use the projection focusing values to calculate the needed camera focusing values so that the camera focusing lens 468 of FIG. 4 can be brought into focus on the projection surface.

In this way, an operator of the central controller 150 of FIG. 1 need only command the projection focus parameter of a particular IPLD to bring the focus of the projected image into focus on a particular projection surface. The projection focus values are used by the processor 316 of FIG. 3 to calculate the camera focus values necessary to bring the captured camera image into focus. The camera focus values as derived from the projection focus values are then sent to the video control interface 317 and the video control interface 317 sends the necessary control signals to the camera 364 to bring the camera lens 468 into the required focus to capture the images from particular projection surface.

In the event that the camera 364 of FIG. 3 does not have a communication system that is capable of communicating the focus values to the video control interface 317, the video image data sent from the camera 364 to the video control interface 317 can be sent to the processor 316 and analyzed to obtain a focus of the projected image on the, projection surface 399. An operator of the central controller 150 of FIG.

1 commands an adjustment of the camera focus parameter of a particular IPLD (for example 102 of FIG. 3) of the projection surface 399.

The adjustment of the camera focus may be done by the operator viewing the projection surface on a visual display device located at the central controller 150 of FIG. 1 and sending adjustment commands for the adjustment of the camera focus from the central controller 150 to the IPLD 102. Instead the camera 364 may have an auto focus capability that focuses the captured camera image of the projection surface 399. In either case, with the captured camera image in a desired focus, the image data (which may be a still image or video image) is sent to the video control interface 317 of FIG. 3.

The video control interface 317 sends the image data to the processor 316 where the image is analyzed for auto focusing techniques. The processor 316 analyzes the image data and incrementally adjusts the position of the projection focusing lens 351 by sending control signals to the motor control interface 318 to incrementally adjust the motor lead screw assembly 376 to move the projection lens 351. The processor 316 analyzes the image data while moving the projection lens 351 to achieve the highest amplitude of the high frequency components of the captured image data. When the highest amplitude of the captured image data is realized by the processor 316, the projected image on the projection surface 399 is considered to be in focus and the projection focusing lens 351 is fixed. The various techniques of analyzing image data to achieve an auto focus are known in the auto focusing art.

Various combinations of the above embodiment could be used collectively to achieve automatic parameter control in an IPLD.

The embodiments set forth herein are merely illustrative and do not limit the scope of the invention or the details therein. It will be appreciated that many other modifications and improvements to the disclosure herein may be made without departing from the scope of the invention or the inventive concepts herein disclosed. Because many varying and different embodiments may be made within the scope of the present inventive concept, including equivalent structures or materials hereafter thought of, and because many modifications may be made in the embodiments herein detailed in accordance with the descriptive requirements of the law, it is to be understood that the details herein are to be interpreted as illustrative and not in a limiting sense.

What is claimed is:

1. A lighting system comprising:

a lamp that projects light onto a projection surface;

an adjustable projection focusing lens that focuses the light projected from said lamp; and a camera that captures images from the projection surface;

said camera having an auto focus system that produces camera focusing values based on the captured images from the projection surface, wherein the camera focusing values are used to automatically adjust the projection focusing lens.

2. The system of claim 1 further comprising a central controller linked to said camera and said lamp via a communications system and including a visual display device that displays the captured images, wherein an operator using said central controller can manually adjust one or more parameters of the images projected onto the projection surface in response to the captured images displayed on the visual display device.

3. The system of claim 2 wherein the one or more parameters are selected from the group consisting of position, focus, image, intensity, and color.

4. A method comprising:

projecting light from a lamp to a projection focusing lens forming an image on a projection surface;

capturing the image on the projection surface using a camera having a camera focusing lens;

receiving a camera focus value for the camera focusing lens; and producing a projection locus signal based on the camera locus value.

5. The method of claim 4 further comprising:

transmitting the captured image to a central controller having a visual display device via a communications system; and displaying the captured image on the visual display device, wherein the camera focusing value is adjusted by commands issued by an operator viewing the captured image at the central controller.

6. A lighting system comprising:

a base a lamp housing coupled to the base, the lamp housing remotely positionable with respect to the base, the lamp housing comprising:

a light source having an adjustable projection focusing lens; and a camera having an adjustable camera focusing lens;

a processor coupled to the light source and camera, and wherein the processor produces a camera locus signal that adjusts focus of the camera focusing lens, and wherein the processor produces a projection focus signal that adjusts focus on the projection focusing lens;

wherein the processor receives a first locus value for the camera focusing lens, produces the camera focus signal based on the first focus value, and wherein the processor calculates the projection focus signal based on the first focus value.

7. The lighting system as defined in claim 6 further comprising:

a central controller comprising a visual display device, the central controller coupled to the processor;

wherein the processor receives the first focus value from the central controller.

8. The lighting system as defined in claim 6 wherein the processor resides within the base.

9. A lighting system comprising:

a base;

a lamp housing coupled to the base, the lamp housing remotely positionable with respect to the base, the lamp housing comprising:

a light source having an adjustable projection focusing lens; and a camera having an adjustable camera focusing lens;

a processor coupled to the light source and camera, and wherein the processor produces a camera focus signal that adjusts focus of the camera focusing lens, and wherein the processor produces a projection focus signal that adjusts focus on the projection focusing lens;

wherein the processor receives a first focus value for the projection focusing lens, produces the projection focus signal based on the first focus value, and wherein the processor calculates the camera focus signal based on the first focus value.

10. The lighting system as defined in claim 9 further comprising:

a central controller comprising a visual display device, the central controller coupled to the processor;

wherein the processor receives the first focus value from the central controller.

11. The lighting system as defined in claim 9 further comprising:

a central controller comprising a visual display device, the central controller coupled to the processor;

wherein a projection surface is not substantially visible to the operator of the central controller except through the visual display device.

12. The lighting system of claim 9 further comprising a housing containing the camera and the light source.

13. The lighting system as defined in claim 9 wherein the processor resides within the base.

14. A lighting system comprising:

a light source having an adjustable projection focusing lens;

a camera having an auto focusing lens;

a processor coupled to the light source and camera, and wherein the processor produces a projection focus signal that adjusts focus on the projection focusing lens;

wherein the processor receives a focus value from the camera indicative of camera focus, and wherein the processor produces the projection focus signal based on the focus value from the camera.

15. The lighting system as defined in claim 14 further comprising:

a central controller comprising a visual display device, the central controller coupled to the processor;

wherein a projection surface is not substantially visible to the operator of the central controller except through the visual display device.

16. A method comprising:

projecting light from a lamp to a projection focusing lens forming an image on a projection surface;

capturing the image on the projection surface using a camera having a camera focusing lens;

receiving a projection focus value from a central controller for the projection focusing lens, and producing a projection focus signal based on the projection focus value; and producing a camera focus signal based on the projection focus value.

17. The method of claim 16 further comprising:

transmitting the captured image to the central controller having a visual display device via a communications system; and displaying the captured image on the visual display device, wherein the projection focusing value is adjusted by commands issued by an operator viewing the captured image at the central controller.

* * * * *